350-3.75
XR 3,816,243
TX 3046 C

United S [11] 3,816,243
Yonezawa et [45] June 11, 1974

[54] HOLOGRAM RECONSTRUCTION SYSTEM

[75] Inventors: Seiji Yonezawa, Hachioji; Akiyoshi Iyama, Sagamihara; Hisatsugu Ito; Keizo Kato, both of Hachioji, all of Japan

[73] Assignee: Hitachi, Ltd., Tokyo, Japan

[22] Filed: Feb. 23, 1973

[21] Appl. No.: 335,297

[30] Foreign Application Priority Data
Feb. 23, 1972 Japan............................47-18079

[52] U.S. Cl........................... 178/5.4 CD, 178/5.4 R
[51] Int. Cl............................................. H04n 9/02
[58] Field of Search.................. 178/5.4 CD, 5.4 ST; 350/3.5

[56] References Cited

UNITED STATES PATENTS

| | | | |
|---|---|---|---|
| 2,880,267 | 3/1959 | Goldmark | 178/5.4 CD |
| 3,506,775 | 4/1970 | McMann | 178/5.4 CD |
| 3,664,248 | 5/1972 | Mueller | 178/5.4 ST |

*Primary Examiner*—Richard Murray
*Assistant Examiner*—Michael A. Masinick
*Attorney, Agent, or Firm*—Craig & Antonelli

[57] ABSTRACT

A hologram reconstruction system employs a hologram with a color picture recorded thereon, on which a collimated beam generated from a laser source is illuminated and a lens converges transmitted beams of the hologram. A rotary disc having sectorial slits is disposed at the back focal plane of the lens, and a camera tube converts the diffraction beams of respective components of red, green and blue derived through the slits of the rotary disc in the form of black and white densities into video signals. A magnetic head records the output signals from the camera tube on a magnetic disc, whereby the recorded electric signals are read out through the magnetic head from the magnetic disc, to reconstruct a color image in conformity with the NTSC system.

15 Claims, 11 Drawing Figures

HOLOGRAM RECONSTRUCTION SYSTEM

BACKGROUND OF THE INVENTION

The present invention relates to a reconstruction system for hologram-recorded color picture. More particularly, it relates to a system in which the respective components of the three primary colors of color pictures recorded as holograms on a recording plane such as a photographic plate, a photographic film and a high polymer material are derived in the form of black and white densities, the densities are converted into video signals, and thus the color pictures are reconstructed as color images.

DESCRIPTION OF THE PRIOR ART

In order to reconstruct a hologram with a color picture recorded thereon as a color image, heretofore the hologram has been irradiated by a collimated beam generated from a white light source, and only the respective red, green and blue components have been selected from a transmitted beam from the hologram by the use of filters of the respective colors of red, green and blue.

However, when the colors of the hologram image are reconstructed using the white light source and the filters, the following three disadvantages, as will be hereinafter described in detail, are encountered:

1. The hue of the reconstructed image differs in dependence on the white light source.
2. A color camera tube is used, which is far more expensive than a black and white camera tube.
3. A high degree of brightness is required for the white light source, which leads to the necessity for a large-sized light source.

SUMMARY OF THE INVENTION

An object of the present invention is to provide a system which reconstructs a color picture from a hologram without employing any color filter.

Another object of the present invention is to provide a system which reconstructs a color picture from a hologram by the use of a black and white camera tube.

Still another object of the present invention is to provide a system which reconstructs from a hologram a color picture free from color shading.

In order to accomplish such objects, according to the present invention, when reconstructing color pictures from holograms in which the respective color information components red, green and blue, as contained in a movie film or the like are recorded in the form of variations in density or phase by diffraction gratings having different directions, a white light source or a laser source is used without employing any color filter, the respective red, green and blue information components are selected from the hologram irradiated by the light source in the form of black and white densities and, by means of a slit provided in the first rotary disc for color selection, the selected black and white densities are subsequently converted into electric signals by means of a black and white camera tube, and the electric signals are displayed as color images in conformity with a conventional system, for example, an NTSC system. If necessary, the color television display is effected by the use of the above-mentioned black and white camera tube and the second rotary disc having a scanning slit perpendicular to the fluorescent screen of the camera tube.

DESCRIPTION OF THE PREFERRED EMBODIMENTS

The present invention will be described hereunder in comparison with the prior art and with reference to the accompanying drawings.

Figure 1:
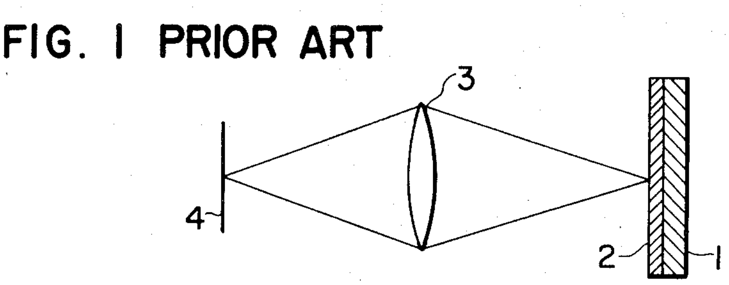
FIG. 1 PRIOR ART
FIG. 1 is a view for explaining apparatus for obtaining the multiple recording of color picture information by the use of diffraction gratings.

First, description will be made of the hologram recording of color pictures used in the present invention. FIG. 1 shows a system for the multiple recording of a number of color picture information as has hitherto been proposed.

As illustrated in the figure, a diffraction grating 2 having a sufficient transmittivity for red is held in close contact with a photographic plate 1, which is exposed to a colored object 4 by the use of a lens 3. Then, only the red information component contained in the colored object 4 is modulated by the diffraction grating 2, and a diffraction image subjected to black and white modulation is recorded on the photographic plate 1.

Subsequently, the diffraction grating 2 is replaced with one which has a sufficient transmittivity for, by way of example, green light. The diffraction grating 2 set anew is rotated within the grating plane by an adequate angle with respect to the position of the previous diffraction grating for red. An exposure as in the case of the diffraction grating of the red transmitting property is carried out for the identical colored object 4. Then, only the green information component contained in the colored object 4 is modulated by the diffraction grating, and the recording of densities is made at a position which is rotated from the position of the preceding recording by an angle corresponding to the rotation of the green transmitting diffraction grating. In this manner, the diffraction gratings 2 transmissive for light of red, green and blue, respectively, are successively replaced and rotated by predetermined angles, and the exposures are repeatedly conducted, whereby the respective picture information of red, green and blue can be recorded on the photographic plate 1 in multiple form.

Figure 2:
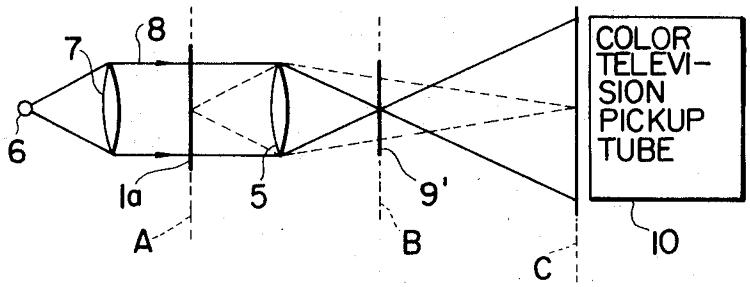
FIG. 2 PRIOR ART
FIG. 2 is a view for explaining a prior-art method for reconstructing the recorded color picture information as obtained by the apparatus in FIG. 1 by the use of color filters.

As for the reconstruction of the information thus recorded, the prior art has been such that, as shown in FIG. 2, a plate 1*a*, obtained by developing the above exposed plate 1, has the color pictures reconstructed by means of a predetermined optical system. In the figure, the photographic dry plate 1*a* with the color information recorded by the method of FIG. 1 is placed at the object plane A of a lens 5 and is irradiated with a collimated beam 8 produced by a white light source 6 and a lens 7.

Figure 3:
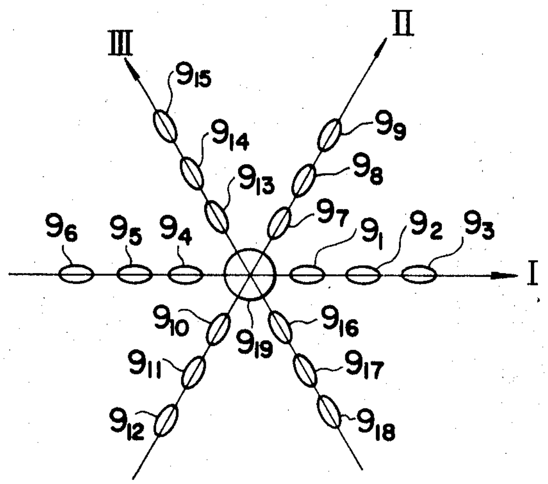
FIG. 3 is an explanatory diagram showing the diffraction images of color pictures for triple recording.

When the photographic dry plate 1a is irradiated with the collimated beam 8, diffraction of light takes place. The diffracted light is converged by the lens 5, and the diffraction images appear at the back focal plane (diffraction image plane) B of the lens 5. As shown in FIG. 3, the diffraction images appearing at the diffraction image plane B become those of ± 1st order, ± 2nd order, ± 3rd order . . . . . . along the three directions I, II and III in correspondence with the directions of the diffraction gratings at the exposures, respectively. In this case, the red information components of the colored object 4 are contained in the diffraction images $9_1$, $9_2$, $9_3$, $9_4$, $9_5$, $9_6$ appearing along the direction I, the green information components are contained in the diffraction images $9_7$, $9_8$, $9_9$, $9_{10}$, $9_{11}$, $9_{12}$ in the direction II, and the blue information components are contained in the diffraction images $9_{13}$, $9_{14}$, $9_{15}$, $9_{16}$, $9_{17}$, $9_{18}$ in the direction III.

Although the diffraction images appear limitlessly in the respective directions I, II and III, it is usually satisfactory to use those within ± 3rd orders. Also, in this specification, the case of employing the diffraction images within ± 3rd orders will be explained.

The respective color filters 9' of red, green and blue are disposed at the diffraction image plane B. For the diffraction images in the respective directions I, II and III, the red filter covers the diffraction images $9_1$–$9_6$ produced by the red light transmitting diffraction grating, the green filter covers the images $9_7$, $9_{12}$ produced by the green light transmitting grating, and the blue filter covers the images $9_{13}$–$9_{18}$ produced by the blue light transmitting grating. For a central diffraction image $9_{19}$ of the order zero, a cut filter for shielding it is disposed.

When the color filters are respectively provided for the diffraction images in this way, the color images of the colored object 4 are reconstructed on a screen which is arranged at the image plane C of the lens 5, as shown in FIG. 2.

However, the method for effecting color reconstruction with the white light source 6 and the respective color filters of red, green and blue, as is illustrated in FIG. 2 has the following three disadvantages.

Figure 4A:
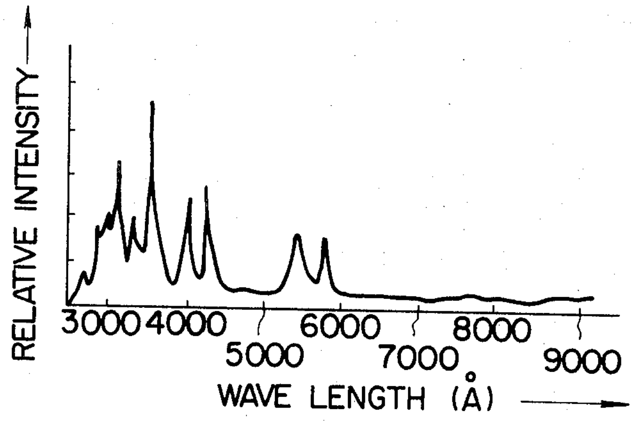
FIGS. 4*a* and 4*b* are spectral diagrams of reconstructing light sources employed in the system in FIG. 2.
Figure 4B:
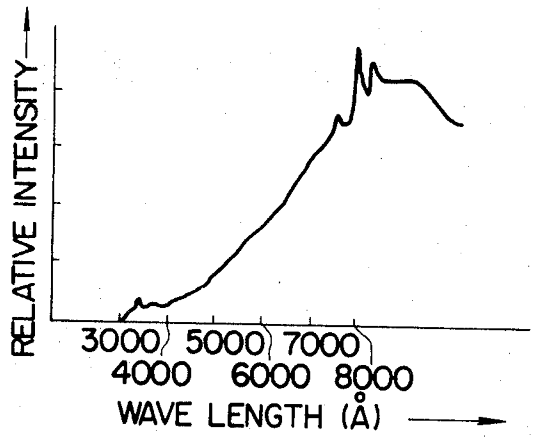

First, since emission of the white light source has a peculiar spectral characteristic in dependence on the type of source used, the hue of the reconstructed image varies in dependence on the light source. For example, a superhigh pressure mercury-arc lamp and a zirconium lamp exhibit spectral characteristics (spectral distributions) as shown in FIGS. 4*a* and 4*b*, respectively. Due to the characteristics, the blue color is stressed with the superhigh pressure mercury-arc lamp in FIG. 4*a*, while the red color is stressed with the zirconium lamp in FIG. 4*b*. For this reason, the color filter need have its transmittivity selected in consideration of the spectral characteristic of the light source.

The second disadvantage is that, where the color image reconstructed at the image plane C is displayed on color television a color camera tube must be used therefor, which tube is much higher in cost than a black and white camera tube.

Further, a third disadvantage is as follows. Among the diffraction images in FIG. 3, for example, those of white light appearing in the direction I indicate the color information for red. Since they include blue and green components other than the red component cut by the red filter, the utilization factor or efficiency of light is lowered to one-third or less. As a result, in order to operate the color camera tube (10 in FIG. 2), the white light source 6 must have at a high brightness. A large-sized light source is, accordingly, necessary.

Figure 6A:
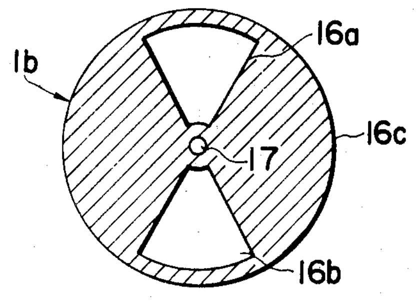
FIGS. 6*a* and 6*b* and FIGS. 7*a* and 7*b* are views for explaining the first and second rotary discs in the system in FIG. 5, respectively.
Figure 6B:
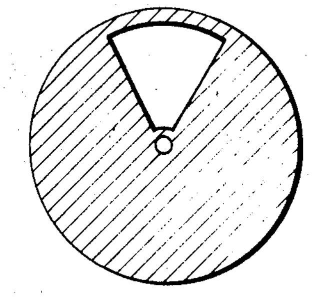
Figures 5, 8:
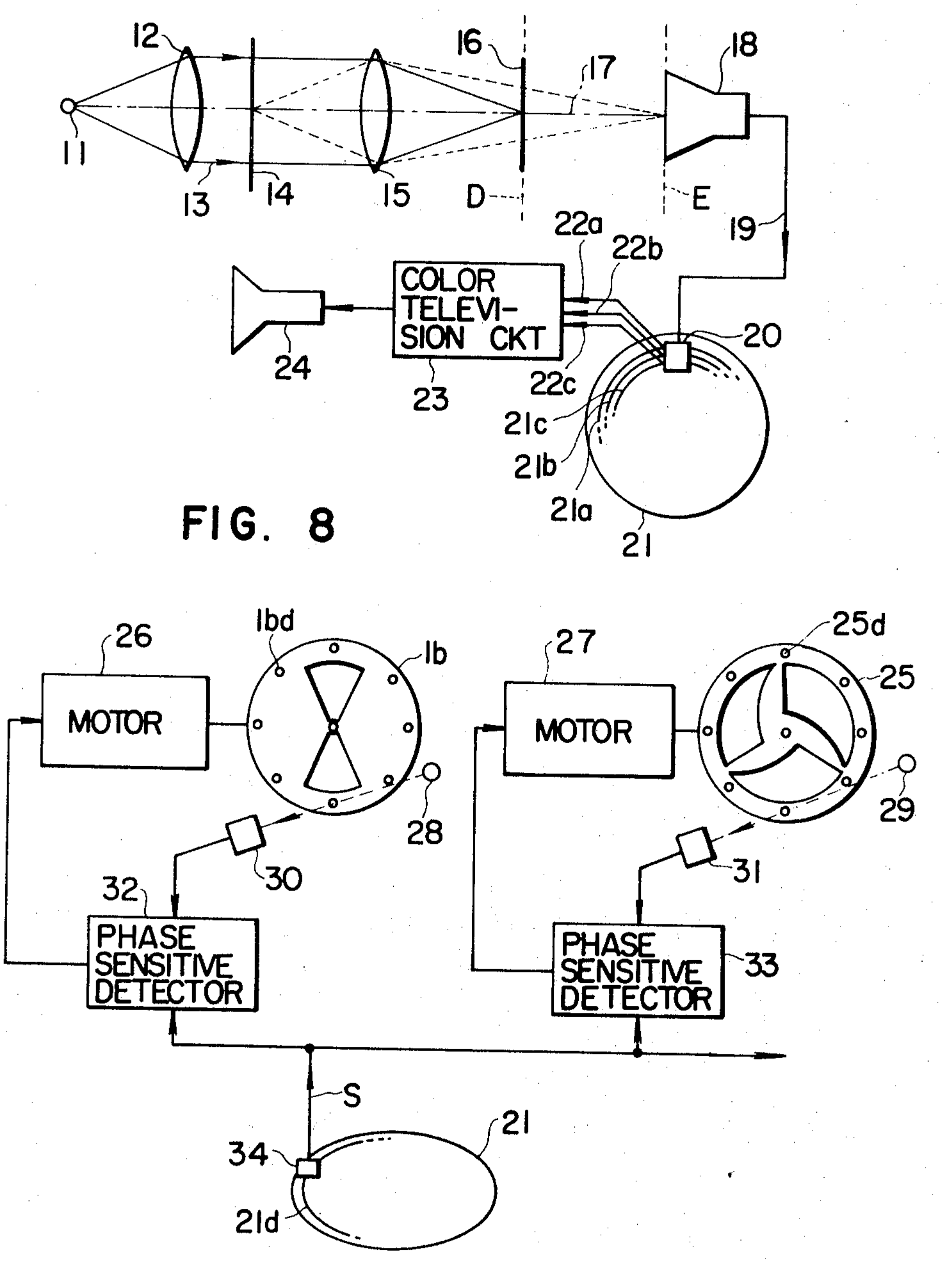
FIG. 5 is a view for explaining a color picture reconstructing system embodying the present invention.
FIG. 8 is an explanatory view showing an example of a servo-circuit for holding the synchronism between the rotary discs and the electron beam of a camera tube.

FIG. 5 shows the construction of an embodiment of the present invention for eliminating the above-mentioned disadvantages. Reference numeral 11 designates a white light source or laser source, 12 a collimator lens, 14 a hologram, 15 a lens, and 16 a rotary disc having a slit or slits as shown in FIGS. 6*a* and 6*b*. The rotary disc 16 is disposed at the rear focal plane D of the lens 15 in such manner that its axis of rotation is aligned with the optical axis. A camera tube 18 is disposed in such manner that its photoelectric plane is brought into registration with the image plane E of the hologram 14 due to the lens 15. Reference numeral 20 indicates a magnetic head, while 21 is a magnetic disc. Reference numeral 23 denotes a circuit for color television conforming to the NTSC standard system, while 24 is a color Braun tube.

With such a construction, the operation of the reconstructing the hologram is as follows. The hologram 14 is irradiated by a collimated beam 13 which is obtained from the laser source or the white light source 11 and the collimator lens 12. Light transmitted through the hologram is converged by the lens 15. The diffraction images of the hologram 14 appear at the rear focal plane D of the lens 15. The configuration of the diffraction images arising at the diffraction image plane D is dotty along the respective directions I, II and III, as illustrated in FIG. 3.

At the diffraction image plane D, the rotary disc 16 as shown in FIG. 6*a* or 6*b* is provided. In FIG. 6*a*, the rotary disc 16 has its axis of rotation identical with the optical axis 17 in FIG. 5, while it corresponds exactly to the diffraction image of the order zero ($9_{19}$) in FIG. 3. The rotary disc 16 is composed of slits 16*a* and 16*b* consisting of sectorial opening portions, and the remaining opaque portion 16*c*. The opening angle of each of the sectorial slits 16a and 16*b* around the center of rotation 17 is 20°–80°.

The rotary disc 16 may also have only one sectorial slit as illustrated in FIG. 6*b*. In addition, the shape of the slit is not restricted to the sector, but it may be any form by which the diffraction images appearing along the respective directions I, II and III can be selected and every information color component transmitted.

In this case, when the slits 16*a* and 16*b* of the rotary disc 16 are at positions for transmitting the 1st to 3rd orders of diffracted beams $9_1$–$9_3$ and the - 1st to 3rd orders of diffracted beams $9_4$–$9_6$ which appear along the direction I in FIG. 3, the information of the color picture in the direction I or the red information component passes therethrough, whereas the green and blue components, traveling in the directions II and III, are itercepted. At the image plane E of the hologram 14, therefore, only the red information component of the color picture is reconstructed in the form of black and white densities.

Similarly, if the slits 16*a* and 16*b* of the rotary disc 16 are at positions for transmitting the diffraction images $9_7$–$9_{12}$ in the direction II, only the green information components pass through the rotary disc 16, and the image of the green components of the color picture is reconstructed at the image E in the form of black and white densities. If the slits 16a and 16b are at positions for transmitting the diffraction images $9_{12}$–$9_{18}$ in the direction III, the image of the blue components of the color picture is reconstructed in the form of black and white densities.

Where unnecessary diffraction images appear in a direction other than the respective directions I, II and III, for example, in the direction between those I and II, an opaque shield plate may be disposed in the particular direction and for example, in front of the rotary disc 16.

When the rotary disc 16, thus installed, is rotated, the diffracted beams of ± 1st, ± 2nd and ± 3rd orders emergent along the directions I, II and III can be sequentially selected. In that case, the red, green and blue components of the color picture as contained in the respective directions I, II and III can be sequentially selected as reconstructed images in the form of black and white densities. Assuming that the change-over among the red, green and blue components is, for example, 60 fields/sec., the rotary disc 16 with the two sectorial slits as shown in FIG. 6*a* may be uniformly rotated at 600 r.p.m. In this way, the red, green and blue components appear at the image plane E in the form of black and white images every one-sixtieth second.

If, in this case, the black and white camera tube 18 has its photoelectric plane coincident with the image plane E, as previously stated, and the scanning of the camera tube 18 is carried out at a speed of 60 Hz per full frame, then the reconstructed color of red, green and blue information components are respectively derived as video signals 19 every one-sixtieth second per frame.

The video signals 19 of the reconstructed color images thus obtained are recorded on the magnetic disc 21 through the magnetic head 20. The recording is effected such that the red video signal is first recorded on a magnetic track 21*a* by one field or for one-sixtieth second, the green video signal is recorded on a magnetic track 21*b* by one field during the next period of one-sixtieth second, and the blue color video signal is subsequently recorded on a magnetic track 21*c* by a one field separation. Where the recording is made on the magnetic disc 21 at the density of 1 field/1 track in this manner, the magnetic disc 21 is rotated at 3,600 r.p.m.

In the case of deriving the signals recorded on the magnetic disc 21, red, green and blue electric signals 22*a*, 22*b* and 22*c* are simultaneously derived from the respective magnetic tracks 21*a*, 21*b* and 21*c* by means of the magnetic head 20. They are passed through the color television circuit 23 according to, for example, the NTSC standard system, to reconstruct a color image on the color Braun tube 24 of a receiving set.

In this way red, green and blue picture information components are obtained in the form of the black and white electric signals, and the color reconstruction image is obtained from the electric signals. The present invention, however, is not confined thereto. It can eliminate non-uniformity in the brightness of the reconstructed picture attributable to the difference in the charge storage time between the initial and terminal stages of the scanning within one frame in the photoelectric plane of the camera tube, it can reduce the influence of the after-image property of the camera tube, and it can prevent color shading from arising.

Figure 7A:
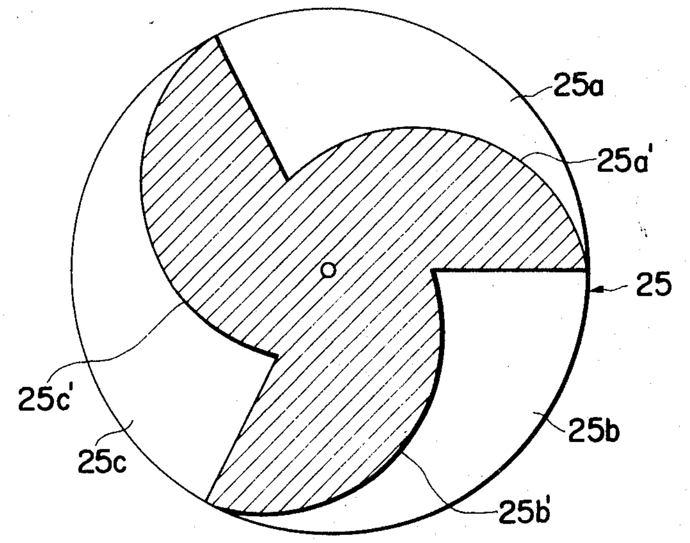

More specifically, immediately ahead of the camera tube 18 in FIG. 5, a second rotary disc 25 is provided which, as shown in FIG. 7*a*, has arcuate opening portions 25*a*, 25*b* and 25*c* for vertical synchronization. It is disposed with its center set-off from the center of the photoelectric plane of the camera tube 18. It is rotated in synchronism with the scanning of the photoelectric plane by an electron beam in the camera tube 18. Thus, when the transmitted light of the diffraction image of a certain color information is projected through the first rotary disc 16, arcuate marginal ends 25*a*′, 25*b*′ and 25*c*′ of the opening portions of the rotary disc 25 gradually conduct the transmitted light on the photoelectric plane of the camera tube in the vertical direction with the rotation of the second rotary disc. In the camera tube 18, the electron beam scans the photoelectric plane following the incidence.

In this manner, the photoelectric plane of the camera tube 18 is scanned by the electron beam at a fixed time after the projection of light is started by the opening portions of the second rotary disc 25. A reconstructed image of uniform brightness can thus be obtained irrespective of the beginning or end stage of the scanning within one frame. Therefore, the rotary disc 25 is rotated at, for example, 1,200 r.p.m., and phase control between the rotation of the rotary disc 25 and the scanning of the electron beam is effected so that the positions of the scanning lines by the electron beam of the camera tube may be brought into synchronism with the opening portions 25*a*–25*c* of the rotary disc 25.

FIG. 8 shows an example of a control device therefor. The first rotary disc 16 and the second rotary disc 25 are driven by motors 26 and 27, respectively. The rotary discs 16 and 25 have apertures 16*d* and 25*d* respectively. Projected light beams from light sources 28 and 29 are caused to impinge on photo-detectors 30 and 31 through the apertures or cut portions 16d and 25d of the rotary discs, respectively. Thus, synchronizing signals are delivered to phase comparators 32 and 33.

To the phase sensitive detectors 32 and 33, there are respectively applied synchronizing signals S which are derived through a magnetic head 34 from a magnetic track for synchronization 21*d* provided on the magnetic disc 21 for recording the respective red, green and blue color signals. The synchronizing signals S are further fed to a scanning circuit (not shown) of the camera tube, to control the scanning by the electron beam in the camera tube. Thus, the rotations of the rotary discs 16 and 25 and the scanning of the electron beam of the camera tube are phase compared, the speeds of revolution of the motors 26 and 27 are controlled by the outputs of the phase comparators 32 and 33, and the synchronism between the rotations and the phase of the electron beam of the camera tube can be maintained.

In this manner, the electron beam scanning can be effected in synchronism with the operation in which, with the rotation of the rotary disc 25, the light passing through its slit moves in the vertical direction on the fluorescent screen of the camera tube. Where synchronization with the electron beam scanning is not effected and where electron beam scanning is carried out after the exposure of or the accumulation of charges on the photoelectric plane, the charge storage time differs between the starting and completing stages of one field of scanning. The brighness is higher at the end part of the scanning, making it impossible to obtain a reconstructed image of uniform brightness.

Figure 7B:
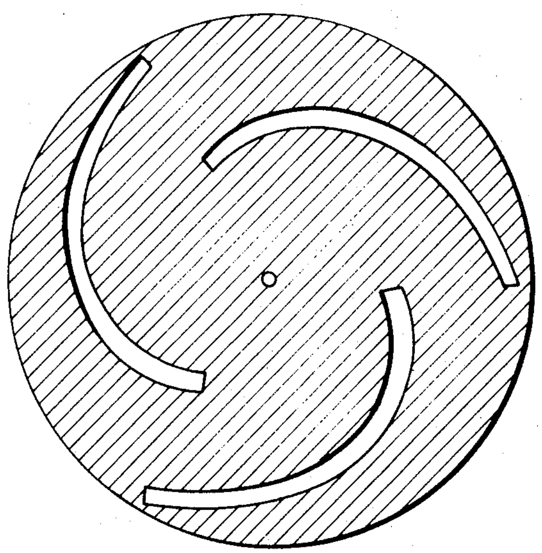

In contrast, in accordance with the present invention, the movement of the light from the second rotary disc and the electron beam scanning are synchronous. The charge storage time is, accordingly, held contant during one field of scanning, so that an image of uniform brightness can be obtained. As the second rotary disc 25, one with spiral slits as shown in FIG. 7*b* is also employable.

As described above in detail, according to the present invention, the reconstruction of color pictures can be made without employing any color filter, the influence otherwise exerted on the color tone of a reconstructed image by a light source for reconstruction or the spectral characteristic of laser light can be prevented, and the lowering of the utilization factor of light can be hindered. In addition, uniformity in the brightness of a picture frame is achieved by the second rotary disc. Moreover, a reconstructed hologram color picture can be displayed on color television by the use of an inexpensive black and white camera tube. The present invention, therefore, accomplishes great effects as a system for reconstructing color pictures stored as holograms.

We claim:

1. A hologram reconstruction system comprising:

a hologram containing respective red, green and blue color information components of an object disposed in respective sets of intersecting stripes;

first means for projecting a light beam onto said hologram, so as to provide respective diffracted beams of light corresponding to the red, green and blue color stripes;

a first rotary disc, provided with at least one slit therein, disposed in the path of said respective diffracted light beams, for successively transmitting therethrough said respective diffracted beams corresponding to the red, green and blue color information components of said hologram;

image pick-up means for receiving said successively transmitted diffracted beams from said first rotary disc and for converting each respectively received beam into an electrical signal representative thereof;

recording means, coupled to said image pick-up means, for successively recording the electrical signals produced thereby; and indication means, coupled to said recording means, for simultaneously reading out the information contained in said recorded electrical signals representative of the respective color components of said hologram.

2. A hologram reconstruction system according to claim 1, wherein said image pick-up means comprises a camera tube, said recording means comprises a magnetic disc having respective tracks for the signals to be recorded representative of said red, green and blue color components, and said indication means comprises a color television circuit and a television display tube coupled in series to the output pick-up of said magnetic disc.

3. A hologram reconstruction system according to claim 1, further comprising a second rotary disc, disposed between said first rotary disc and said image pick-up means, and having respective slits therein, for scanning the diffracted beams transmitted to said image pick-up means in one direction of the photoelectric conversion plane of said image pick-up means.

4. A hologram reconstruction system according to claim 3, further including a phase sensitive synchronous detector means, coupled to each of said first and second rotary discs, said image pick-up means and to said recording means, for controlling the rotation of said discs and the scanning of the image received by said image pick-up means in synchronism, whereby an image of uniform brightness is obtained.

5. A hologram reconstruction system according to claim 1, further including a lens disposed between said hologram and first rotary disc so that said hologram and said first rotary disc are at the front and rear focal planes of said lens respectively.

6. A hologram reconstruction system according to claim 5, wherein said image pick-up means has its photo-electric conversion plane coincident with the image plane of the light from said hologram converged by said lens.

7. A hologram reconstruction system according to claim 5, further comprising a second rotary disc, disposed between said first rotary disc and said image pick-up means, and having respective slits therein, for scanning the diffracted beams transmitted to said image pick-up means in one direction of the photoelectric conversion plane of said image pick-up means.

8. A hologram reconstruction system according to claim 7, further including a phase sensitive synchronous detector means, coupled to each of said first and second rotary discs, said image pick-up means and to said recording means, for controlling the rotation of said discs and the scanning of the image received by said image pick-up means in synchronism, whereby an image of uniform brightness is obtained.

9. A hologram reconstruction system according to claim 1, wherein said first means comprises a light source and a collimating lens disposed between said light source and said hologram.

10. A hologram reconstruction system according to claim 9, further including a lens disposed between said hologram and first rotary disc so that said hologram and said first rotary disc are at the front and rear focal planes of said lens, respectively.

11. A hologram reconstruction system according to claim 10, wherein said image pick-up means has its photo-electric conversion plane coincident with the image plane of the light from said hologram converged by said lens.

12. A method of reconstructing a hologram comprising the steps of:

a. providing a hologram containing respective distinct red, green and blue color information components of an object disposed in respective sets of intersecting color image areas;

b. projecting a light beam onto said hologram, so as to provide respective diffracted beams of light corresponding to the red, green and blue color image areas of said hologram;

c. providing a lens in the path of said diffracted beams of light, with the front focal plane of said lens corresponding to the position of said hologram;

d. controlling the transmission of said diffracted beams to the image plane of the light from said hologram passing through said lens, by sequentially transmitting substantially only the diffracted beam for each respective one of said red, green and blue color components;

e. receiving each of said sequentially transmitted diffracted beams and converting said beams into respective electrical signals representative thereof;

f. recording each of said electrical signals; and g. simultaneously displaying the information contained in said electrical signals, so as to provide a reconstructed image of said hologram.

13. A method of reconstructing a hologram according to claim 12, further including the step of sequentially scanning the diffracted beams the transmission of which is sequentially controlled in step (d) in synchronism with said step (d).

14. A method of reconstructing a hologram according to claim 12, wherein said step (d) comprises sequentially intercepting said respective diffracted beams with a first rotating disc having at least one slit therein.

15. A method of reconstructing a hologram according to claim 14, further including the step of sequentially scanning the diffracted beams the transmission of which is sequentially controlled by said first rotating disc by rotating a second disc in the path of each transmitted diffracted beam, said second disc having prescribed apertures therein, in synchronism with the reception and conversion of said diffracted beams into electrical signals in step (e).

* * * * *